United States Patent [19]

Bruner

[11] 3,754,250
[45] Aug. 21, 1973

[54] REMOTE METER READING SYSTEM EMPLOYING SEMIPASSIVE TRANSPONDERS

[75] Inventor: James N. Bruner, Springfield, Ill.

[73] Assignee: Sangamo Electric Company, Springfield, Ill.

[22] Filed: July 10, 1970

[21] Appl. No.: 53,745

[52] U.S. Cl........ 343/6.5 LC, 340/152 T, 343/6.8 R
[51] Int. Cl. .............................................. G01s 9/56
[58] Field of Search................ 340/151, 152 T, 189; 343/6.5 R, 6.5 LC, 6.5 SS, 6.8 R, 6.8 LC, 18 D

[56] References Cited
UNITED STATES PATENTS

| | | | |
|---|---|---|---|
| 3,631,484 | 12/1971 | Augenblick ..................... | 343/6.5 R |
| 3,566,384 | 2/1971 | Smith et al..................... | 340/151 X |
| 3,522,602 | 8/1970 | Ver Planck ................... | 343/6.8 R X |
| 3,258,692 | 6/1966 | Jacomini et al................. | 340/151 X |
| 3,503,061 | 3/1970 | Bray et al. ...................... | 340/151 X |
| 3,159,836 | 12/1964 | Zaleski et al. .................... | 343/18 D |

Primary Examiner—T. H. Tubbesing
Attorney—Johnson, Dienner, Emrich, Verbeck & Wagner

[57] ABSTRACT

A remote meter reading system having a transponder for each meter or group of meters to be read including an antenna having a receive section for receiving interrogate signals transmitted from a mobile interrogating unit, and a transmit section for reradiating modulated interrogate signals back to the mobile unit; a non-linear impedance network connected between the transmit section and the receive section of the antenna controllable to modulate the meter interrogate signals, and meter data storage apparatus for providing data signals representing a meter reading and meter identification to modify the impedance of the non-linear impedance device and thereby effect modulation of the interrogate signals. The modulated interrogate signals are reradiated by the transmit section of the antenna to convey the meter reading and identification to the mobile unit.

52 Claims, 15 Drawing Figures

MOBILE UNIT TRANSMIT ANTENNA CONFIGURATION

MOBILE UNIT RECEIVER ANTENNA CONFIGURATION

INVENTOR
JAMES N. BRUNER

BY Johnson Dienner Emrich Verbeck & Wagner
ATTYS.

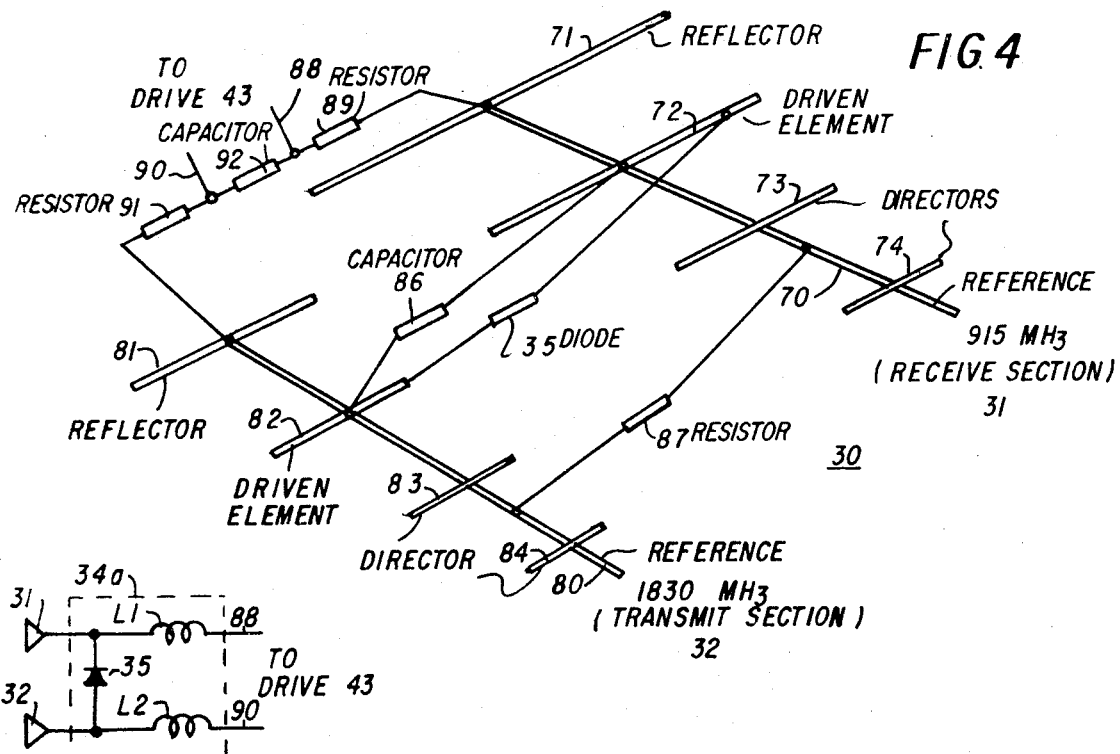
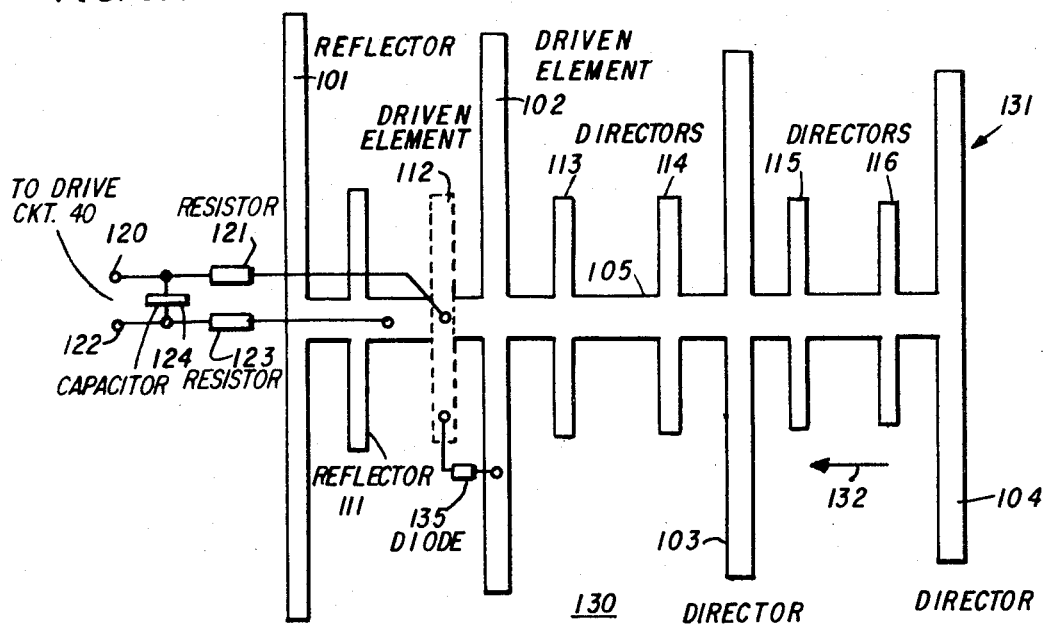

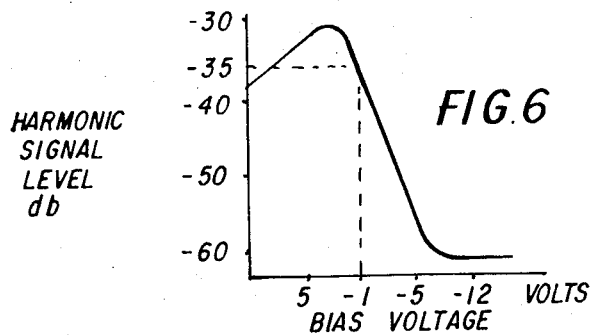
FIG.6
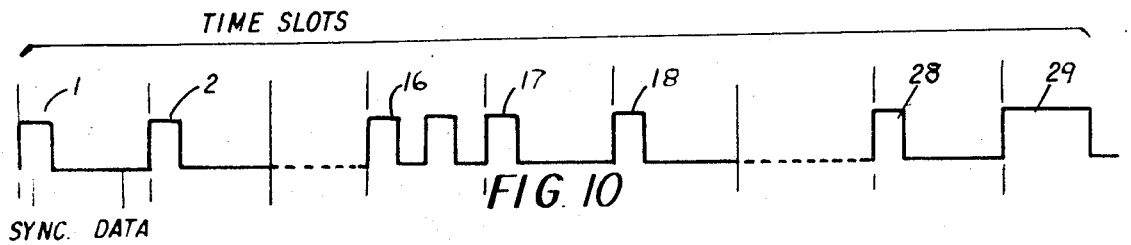
FIG.10
FIG.11
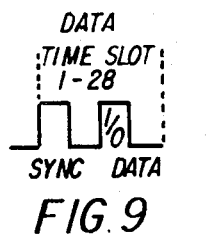
FIG.9
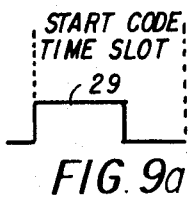
FIG.9a
TRUTH TABLE FOR PULSE DIVIDER CKT. 241
| | Q1 | Q2 | Q3 | Q4 |
|---|---|---|---|---|
| 1 | 0 | 1 | 0 | 1 |
| 2 | 1 | 0 | 0 | 1 |
| 3 | 0 | 1 | 1 | 0 |
| 4 | 1 | 0 | 1 | 0 |
FIG.8
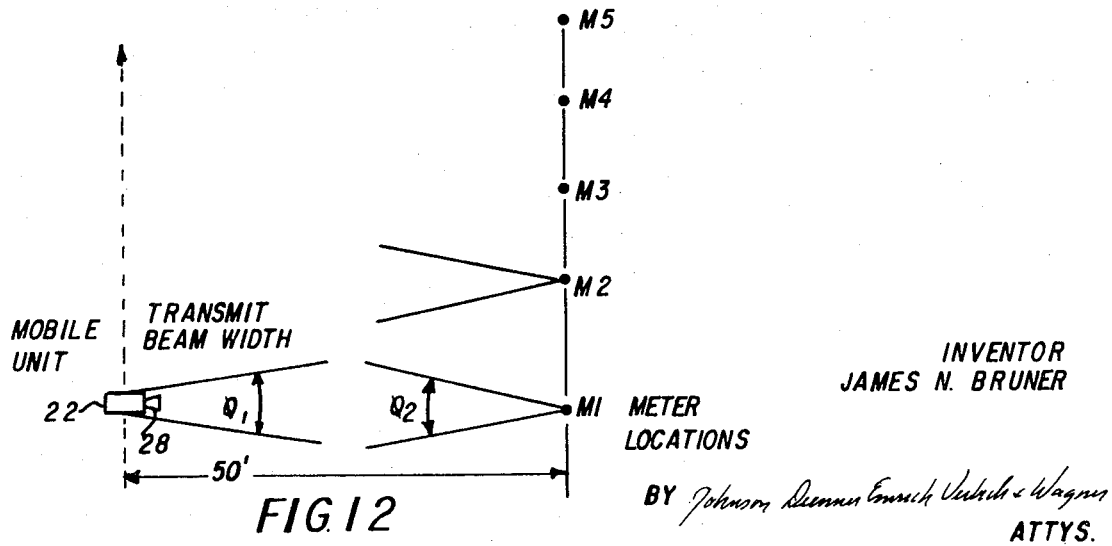
FIG.12
INVENTOR
JAMES N. BRUNER

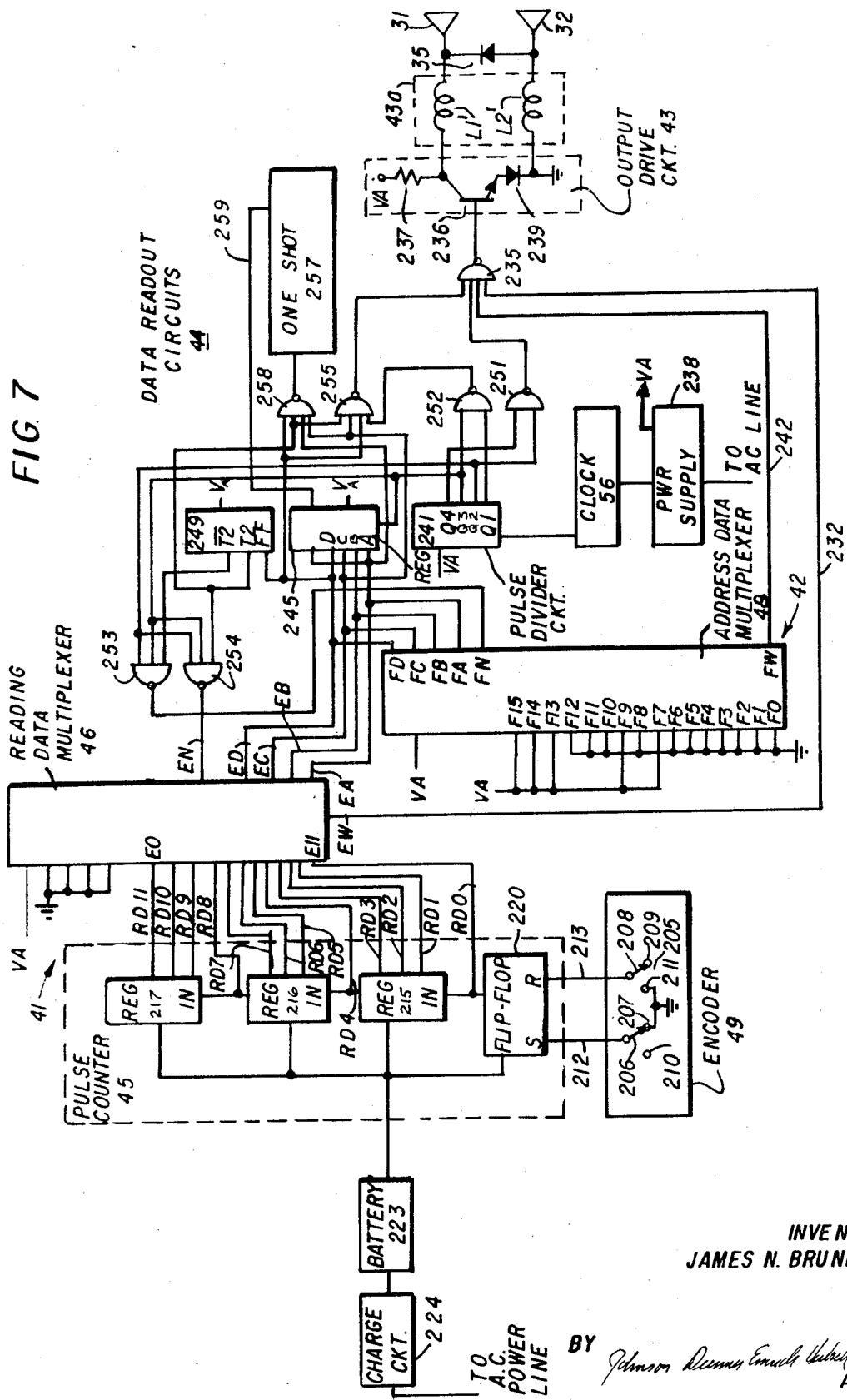

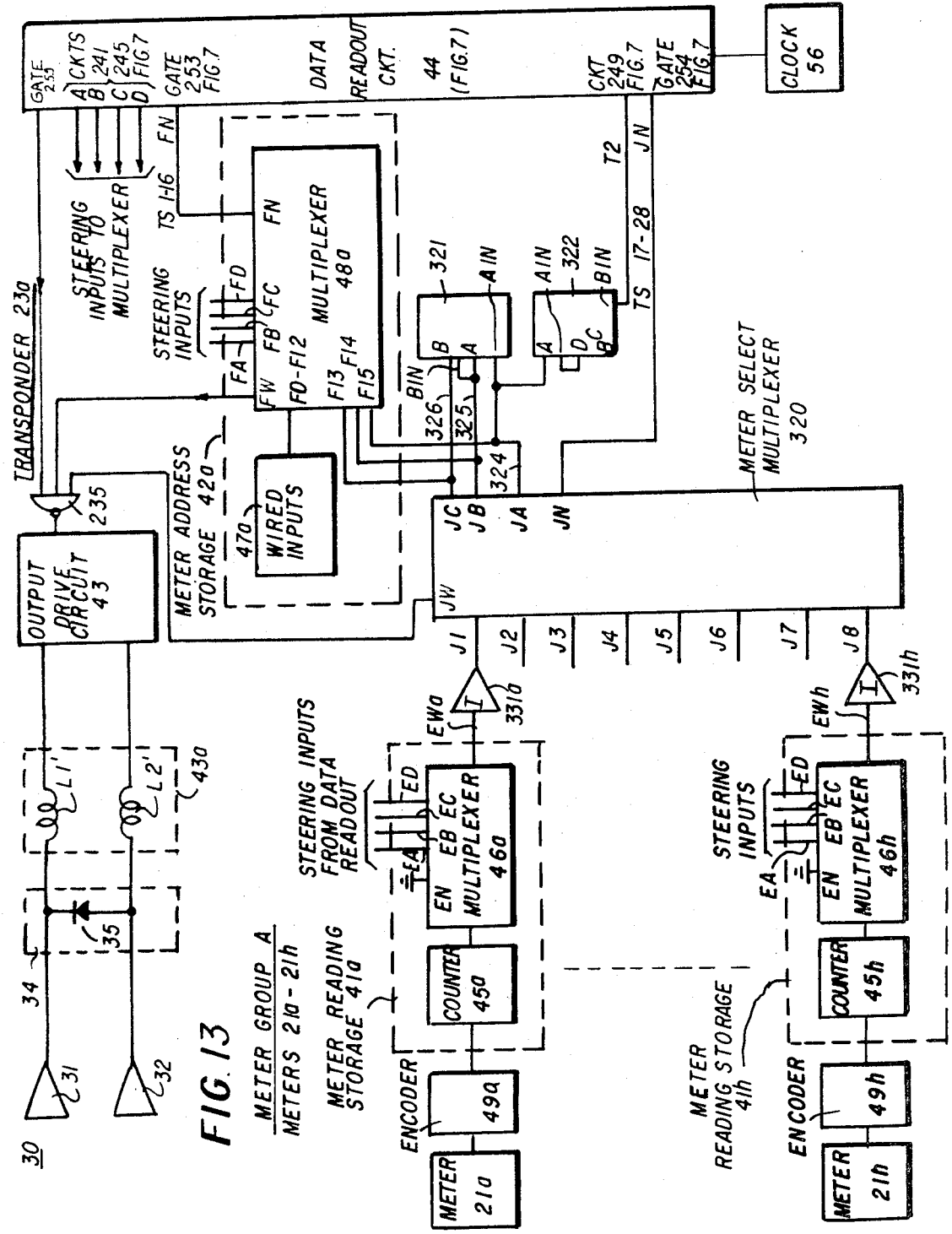

REMOTE METER READING SYSTEM EMPLOYING SEMIPASSIVE TRANSPONDERS

BACKGROUND OF THE INVENTION

1. Field of the Invention

This invention relates to remote meter reading systems and more particularly, to a remote register reading system in which signals representing meter reading data are transmitted from a meter to a mobile interrogate unit.

2. Description of the Prior Art

At present, utility meters which measure and register the quantity of a commodity used, such as electricity, gas, water, or the like, are read manually by employees of the company providing the commodity. However, manual reading of meters is a slow, expensive process subject to human error, and at times can be physically dangerous for the meter reader. In addition, the intrusions by the meter reader are often resented and discouraged by customers.

To simplify the meter reading process and to minimize manpower requirements, attempts have been made to provide remote reading of meters over customer telephone lines. However, remote meter reading via telephone lines has not proven practical due to the cost and difficulties involved with obtaining permission from telephone companies to use the telephone lines, the problem of proper identification of the telephone customer versus the meter customer, and the need to obtain meter readings without interfering with the customer's use of the telephone line or causing other inconveniences to the customer.

SUMMARY OF THE INVENTION

The present invention provides a meter reading system having a mobile unit which travels along a route laid out along the streets and roads of a community, and in its travel transmits interrogating signals to the meter equipment located at the houses along such route. The meter equipment at each house includes a transponder for automatically sending signals which represent the reading on the meter along with an identification number which is assigned to the meter. Receiver means on the mobile interrogating unit receive the meter interrogate signals as the directive antenna on the mobile unit moves into the range and bearing of the transmitting means on the meter equipment for each house.

The transponder unit associated with each meter comprises an antenna having a transmit and receive section, and a non-linear impedance network (such as a non-linear diode) connected therebetween. As the mobile unit moves into the bearing and range of the transponder unit for one of the meters, the interrogate signals tranmitted by the mobile unit are received by the receive section of the transponder antenna (which is tuned to the frequency of the interrogate signals), and impressed across the associated diode to effect non-linear changes in the impedance of the diode. The distortion of the received signals as applied to the diode effects the consequent generation of harmonics of the received interrogate signals which are in turn used to transmit information back to the mobile unit.

Since the transmit section of the transponder antenna is turned to the frequency of the generated harmonic of the interrogate signals, the antenna will be operative to radiate the resultant harmonics back to the mobile unit. As the harmonic signals thus generated are retransmitted to the mobile unit, control circuitry in the meter equipment controls modulation of the retransmitted signals with meter data (i.e., in the present example the reading on the meter register at the time and the identity number for the meter).

In the present embodiment the meter register data as used to modulate the harmonic signals is converted by transponder circuitry into bits of first and second levels. The two level data is then read out and applied by the circuitry as first and second bias conditions respectively for the non-linear diode. With bias levels of alternate levels applied to the nonlinear diode, the signal level of the harmonics generated will correspondingly be of different magnitudes (first and second) so that the harmonic signals radiated to the mobile unit will, as modulated, provide meter information to the equipment at the mobile unit as amplitude variations of the harmonic signals. The harmonic signals received at the mobile unit are translated into data bits of a first and second value (1 and 0) which as a word represent the meter reading and meter identification for such meter.

It will be apparent that the amount of signal receiving equipment required in the mobile unit is minimized inasmuch as the information bearing signals radiated to the mobile unit are Type A1 emission (keyed CW) signals and accordingly, a commercially available receiver can be used to detect the information signals radiated from the mobile unit.

In the exemplary illustration, the signals which serve as the information carrier are the second harmonic of the interrogate signals. Since the exact frequency of reradiation is controlled from the mobile unit, a narrow band width receiver may be used and a high signal-to-noise ratio is provided along with improved sensitivity, and low power operations. Further since the frequency of the information signals radiated from the mobile unit is always twice the frequency of the interrogate signals, the operation of the system is made less critical.

The control by the mobile unit of the signal frequency transmitted from the meter equipment is an important factor of the invention. That is, in systems in which an oscillator is used at each meter location to provide a frequency signal which represents the information to be read out, changes in temperature or potential which affect the frequency output of the oscillator requires that the mobile unit be capable of adjusting to these variations for the different units in the system which may have changed frequency values by reason of changing environmental conditions. Automatic compensation for such variations is of course expensive and complex. Such problem is completely eliminated in the present system where the frequency signal received by the mobile unit is always twice the value of the signal transmitted by the mobile unit.

Since the transponder at the meter comprises a semipassive network, negligible power is required to effect modulation of the interrogate signals received to represent the meter reading data. As a result, the power source for the equipment may be considerably simplified. Moreover, the transponder for each meter location comprising an antenna and a nonlinear diode provides an inexpensive way of permitting transmission of meter reading data from each meter location. The cost of the meter transmission unit is an important feature of the novel system since in effecting remote reading of a utility meter installation a very large number of meter transponder units must be provided.

The transponder, including the antenna and the non-linear diode, is a simple structure providing a compact package which is readily installed. According to a further feature of the invention a simple, one-piece, stamped antenna of small dimension is provided for each transponder, whereby cost of the transmitting equipment is maintained at a low order while yet providing an improved form of transponder readout equipment. Standard low-current conductors are used to interconnect the antenna with the transponder since these conductors carry only DC bias levels. The fact that the interconnection between the transponder and the data storage circuits at the meter does not require RF lines which are generally large, inconvenient, unsightly and expensive is a further feature of the invention.

Yet another feature is present in the fact that the radio frequency signals transmitted from the meter location to the remote unit are within the harmonic content of the transmitter of signals, and it is therefore not necessary to license the transponders since the license for the mobile unit equipment will also apply to the transponders.

While the specific embodiment set forth herein is directed to use of the invention in the reading of utility meters located at the home of the user, it will be apparent that the system and portions thereof may be used in a like manner to provide a readout of data or information provided by many other types of equipment located in many different types of equipment located in many different types of locations.

These and other objects and features of the invention will be apparent with reference to the accompanying drawings.

DESCRIPTION OF THE DRAWINGS

FIG. 4 is an isometric view of one embodiment of a meter transponder antenna;

FIG. 4a is a circuit schematic for the antenna shown in FIG. 4;

FIG. 5 is a plan view of a second embodiment of a meter transponder antenna;

FIG. 6 is a plot of harmonic signal level versus bias for a non-linear terminating impedance for the meter transponder antenna;

FIG. 7 is a schematic block diagram of the circuit of the meter transponder of FIG. 1;

FIG. 8 is a Truth Table for a circuit of the transponder data readout circuits;

FIG. 9 is a representation showing the position of data and sync pulses for the time slots in which data is being read out;

FIG. 9a is a representation of the start of message code pulses provided by the data readout circuits of the transponder;

FIG. 10 shows portions of a logic pulse train provided by a readout of a meter in accordance with an exemplary illustration;

FIG. 11 shows portions of a pulse train comprising modulated information signals radiated from a meter transponder;

FIG. 12 is a schematic representation of a mobile unit and a plurality of meter locations showing how antenna directivity permits individual readout of a plurality of meters; and FIG. 13 is a schematic block diagram of circuits for providing readout of a plurality of meters from one location.

DESCRIPTION OF A PREFERRED EMBODIMENT

General Description

Figure 1:
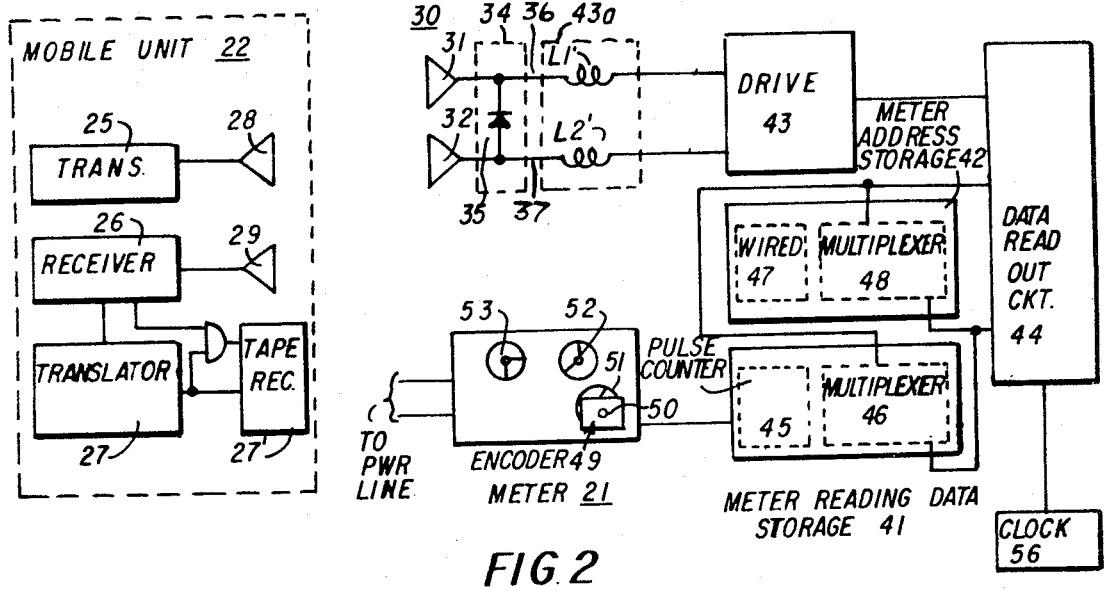
FIG. 1 is a block diagram of a mobile unit and a meter transponder for a remote meter reading system provided by the present invention.

Referring to fig. 1, there is shown a block diagram of preferred embodiment of a remote meter reading system in which a mobile unit 22 is used to obtain meter reading data from a plurality of meters, such as a meter 21, by transmitting interrogate signals to a transponder, such as transponder 23, associated with the meter 21 to be read.

The mobile unit 22 includes a transmitter 25 for transmitting meter readout or interrogate signals of a given frequency which in the exemplary illustration is 915 MHz to the transponder at the meter location, and a receiver 26 for receiving modulated signals of a frequency of 1,830 MHz, the second harmonic of the interrogate signals, which are reradiated from the transponder. The signals input to receiver 26 from transponder 23 are modulated to provide (a) the meter reading at the time of interrogation, and (b) a discrete meter identification number of address for identifying the meter which is being read. The signal output of receiver 26 is fed to signal translation equipment 27 which recovers the meter data information in the modulated incoming signal and feeds the same to associated storage equipment 27' (which may be a commercially available magnetic tape recorder) for storage and use in subsequent billing purposes.

The transponder 23 includes an antenna 30 having a separate receive section 31 and a separate transmit section 32. The transmit section 32 and receive section 31 are interconnected by a semi-passive network 34 having a non-linear impedance characteristic. The non-linear network 34 serves as the terminating impedance for the antenna 30.

In the illustrated embodiment, the network 34 is comprised of variable capacitance diode 35 (a semiconductor diode-type device, the junction capacitance of which varies inversely with reverse bias). The diode 35 is responsive to changes in the amount of applied reverse bias to present non-linear changes in the antenna terminating impedance characteristic. Hence the device 35 presents a non-linear loading for the antenna 30, resulting in distortion of the interrogate signals received by the antenna and the generation of harmonics of the signals received. The signal level of the harmonics generated is a direct function of the bias condition of the diode.

The amount of reverse bias applied to the diode 35 is varied in accordance with logic signal outputs which are provided by a meter reading data storage circuit 41 and a meter address storage circuit 42. As will be shown, the data storage circuit 41 includes a multiplexer 46 and associated pulse counter circuit 45 which provides a twelve bit data word representing the meter reading at any given time and the meter address data storage circuit 42 includes a multiplexer 48 and an associated wiring circuit 47 which provides a sixteen bit data word which identifies the preassigned address or identification number for the meter 21.

Data readout circuit 44 driven by clock 56 reads out the logic signal outputs of the meter data storage 41 and the meter address data register 42 and via driver 43 lumped or distributed impedance network 43a and conductors 36, 37 varies the reverse bias on the diode 35 to effect amplitude modulation of the harmonics generated such that the amplitudes of the harmonic signals radiated to the mobile unit are indicative of the meter reading data and the meter address.

Mobile Unit

More specifically, the signal generator 25 located in the mobile unit 22 generates radio frequency signals at a frequency rate of 915 Mhz. The power strength of the signals generated by the signal generator 25 may be, for example, four watts. A suitable signal generator is commercially available.

The transmit range of the transmitter 25 is a function of the power capabilites of the transmitter 25 and of the configuration of the transmitting antenna 28 of the mobile unit. Another factor involved, of course, is the location of the transponder antenna 30; however, due to the nature of the transponder operation, the transponder antenna can be positioned to permit convenient access to the antenna by the mobile unit.

Figure 2:
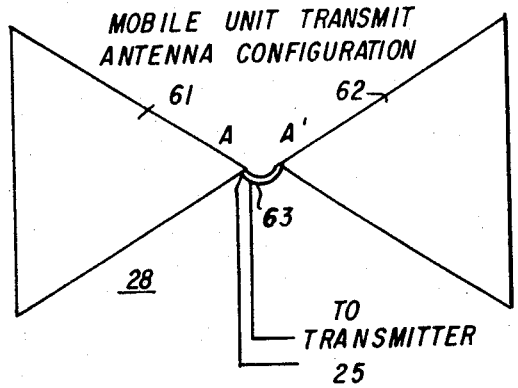
FIG. 2 is a schematic representation of a transmit antenna for the mobile unit.

The signals generated by the signal generator 25 are coupled to the transmit antenna 28 of the mobile unit 22. The transmit antenna 28, shown in FIG. 2, is of the horn-type to enhance the directivity of the mobile transmitter. The antenna 28 has a pair of triangular-shaped side members 61, 62 serving as signal radiators, interconnected at apexes A, A'; by a terminating impedance 63 which provides a balanced impedance characteristic for the antenna 28, allowing maximum power transfer and maximum directivity.

The side members 61, 62 are approximately two wavelengths of the transmitted signal in length from apex to base, and the horn opening, that is, the angel of separation of the side members 61, 62 from one another, from apex to base is approximately sixty degrees. This antenna configuration provides a gain in the transmitted signal of approximately 14 db over the signal strength radiated from a point source.

Meter selection is accomplished through the directivity of the antenna system rather than by special coding of the meter interrogate signals. In this way, the amount of circuitry required in the mobile unit and at each meter location is minimized.

Accordingly, the beam width of the transmit antenna 28 determines the selectivity of the system as well as the transmission distance between he mobile unit and the meters being interrogated.

The mobile unit further includes a receiver 26 for detecting signals at a frequency of 1,830 Mhz, which are reradiated from the transponder 23 of the meter 21. The signals radiated from the transponder are the second harmonic of the 915 Mhz interrogate signals transmitted from the mobile unit. The signals radiated from the transponder 23 are received at a receive antenna 29, tuned to the frequency 1,830 Mhz, and coupled to the receiver 26.

Figure 3:
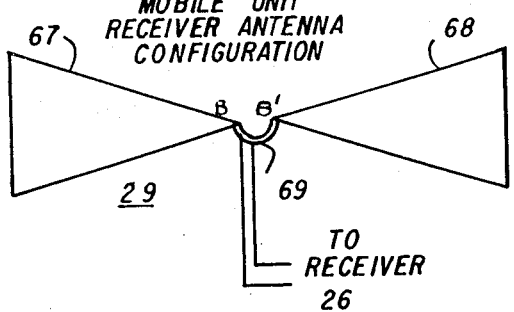
FIG. 3 is a schematic representation of a receive antenna for the mobile unit.

The receive antenna 29, shown in FIG. 3, is also a horn type antenna, similar to the transmit horn antenna 28, and is of importance to the selectivity of the system.

The receive antenna 29 has a pair of triangular-shaped side members 67, 68 for receiving the signals radiated from the transponder 23. The side members are interconnected at apexes B, B' by a terminating impedance 69 which provides a balanced impedance characteristic for the receive antenna 29.

The side members 67, 68 are approximately four wave lengths of the received signals in length from apex to base, and the horn opening, that is, the angle of separation from apex to base is approximately 38°.

The signals detected by the receiver 26 are passed to translation apparatus 27 which converts the harmonic signals detected, or the absence of harmonic signals into digital information for storage in the mobile unit storage circuits 27' on magnetic tape. Alternately, the data can be retransmitted from the mobile unit to a central control location using R.F. transmission techniques. Data translation and storage equipment suitable for this purpose is well known in the art.

Meter Transmitting Unit

The meter transponder antenna 30 has a receive section 31 and a separate transmit section 32 interconnected by a non-linear impedance network 34 embodied as a variable capacitance diode 35, or varactor diode.

Data signals representing the meter information are provided by the data readout circuit 44 via driver 43 and impedance network 43a across diode 35. As explained heretofore, the signals are applied to vary the reverse bias on diode 35 to effect amplitude variations of the harmonic signals radiated to the mobile unit by the antenna transmit section. As will be shown, the data signals are applied to the diode 35 as bits of a word. In the present example, words having 29 time slots provide 58 bits of information including both data and sync signals for effecting modulation of the harmonic signals radiated by the antenna.

A Yagi type of antenna, such as that shown in FIG. 4, is particularly suitable for this application. The separate transmit and receive sections of the antenna are individually tunable, and the diode 35 which comprises the non-linear terminating impedance 34 can easily be connected between certain elements, such as elements 82 and 72, respectively, which comprise the transmit and receive sections of the antenna.

The receive section of the antenna is superposed over the transmit section and includes a boom or reference element 70 supporting four elements, a reflector 71, a driven element 72, and directors 73 and 74. The elements 71–74 are secured to the boom 70 approximately at midlength and spaced apart from one another along the length of the boom 70 at 0.2 wave length distances.

The antenna receive section is tuned to 915 MHz for receiving the meter interrogate signals transmitted from the mobile unit 22.

The lengths of the elements 71–74 are related to the frequency to which the antenna is tuned. In the described embodiment, the boom element 70 is approximately 8.5 inches, the length of the reflector 71 is approximately 6.8 inches; and the lengths of the driven element 72, the director element 73 and the director element 74 are successively about five per cent shorter in length from element 72 to element 74.

The transmit section 32 of the Yagi antenna 30 is similar in structure to the receive section 31 and includes a boom 80 carrying four elements, namely a reflector 81, a driven element 82, and a pair of directors 83 and 84. The elements 81–84 are attached to the boom 80 at their midlength and spaced apart from one another along the length of the boom 80 by about 0.2 wavelength separation. The transmit section 32 of the antenna 30 is tuned to 1,830 Mhz, the second harmonic of the interrogate signals. The length of the boom 80, approximately 4.5 inches, is related to the frequency to which the antenna is tuned. The reflector element 81 is approximately 3.8 inches in length, and the driven element 82, the driector element 83 and the director element 84 are successively about 5 percent shorter in length from the reflector element 81 to the director element 84.

The elments 70–74 and 80–84 of the antenna may comprise rod shaped members of a suitable conducting material. The receiving and sending elements 71–74 and 81–84 are wired or welded to the supporting booms 70 and 80.

The antenna having the particular configuration shown in FIG. 4 of the drawing, that is, having four elements 71–74 in the receive section 31 and four elements 81–84 in the transmit section 32, provides a 6 db gain for the received signal. Other antenna configurations comprising a different number of elements could also be used. For example, an antenna having only two elements in each section, a reflector and a driven element, would provide a gain of about 3 db whereas an antenna having eight elements would provide a gain of about 8 db.

The boom 70 of the receive section 31 of the antenna 30 is aligned in parallel relation with the boom 80 of the transmit section 32 and may be spaced apart from the boom 80 about three-quarters of an inch by impedance matching elements, including a capacitor 86 and a resistor 87 which are electrically and mechanically connected between booms 70 and 80.

The additional impedance elements capacitor 86 and resistor 87 are not essential, but do improve the impedance characteristic of the antenna 30. The capacitance 86 is shown in FIG. 4 connected between the driven element 72 of the receive portion 31 of the antenna and the driven element 82 of the transmit portion 32 of the antenna, and the resistor 87 is shown connected between the boom 70 of the receive section 31 of the antenna and the boom 80 of the transmit section 32 of the antenna. Alternatively, if the capacitor 86 and the resistor 87 are not used, suitable insulating members (not shown) may be employed to maintain the desired separation between the two antenna sections.

The receive driven element 72 is positioned to be approximately in superposed relationship with the driven element 82 of the transmit section 32 of the antenna 30, and the positions of the remaining elements 71, 73, 74 of the receive section 31 are determined by the 0.2 wavelength spacing between adjacent elements.

The meter interrogate signals transmitted from the mobile unit 22 are received between the two sections 31, 32 of the antenna 30 and are modulated in accordance with the terminating impedance, the non-linear diode 35, of the antenna 30.

The varactor diode 35 which comprises the terminating impedance for the antenna 30 has its anode connected to the driven element 82 of the transmit section 32 of the antenna at a point along the length of the driven element 82 about 1 inch from the midpoint of the element 82 where the element is secured to the boom 80. The cathode of the diode 35 is similarly connected to the driven element 72 of the receive section 31 of the antenna 30 at a point along the length of the driven element 72 about one inch from the midpoint of the element 72 where the element is secured to the boom 70.

The data signals which modulate the harmonic signals provided by the diode 35 may be applied directly across the diode 35 as shown in FIG. 1 (in which case a separate lumped or distributed impedance network 43a is used) or alternatively, the signals may be applied over conductors 88, 90 and a part of the antenna 30, as shown in FIG. 4. In such arrangement, conductor 88 is connected to the boom 70 of the receive portion 31 of the antenna through a resistor 89, and conductor 90 is connected to the boom 80 of the transmit portion 32 of the antenna through a resistor 91, and a capacitor 82 is connected between conductors 88 and 90. In such arrangement, the inductance of the antenna serves to isolate the diode 35 from ground and the lumped (or distributed) impedance network 43a may be eliminated. The circuit schematic for the connection shown in FIG. 4 is illustrated in FIG. 4a. In such schematic, the impedance of the receive section 31 of the antenna 30 is shown as a lumped inductance L1 having one end connected to the cathode of the diode 35, and the other end connected to an ouput driver circuit 43 of data readout circuit 44.

The transmit section 32 of the antenna is also represented as a lumped inductance L2 having one end connected to the anode of the varactor 35 and the other end connected to the output circuit 43 of the data readout circuit 44. Since the data signals applied across the diode 35 are DC control bias voltages for the diode 35, the conductors, such as 88, 90, which apply the signals to the antenna (or directly across the diode, as the case may be) are comprised of hook-up wire or bell wire. It is not necessary to use a special antenna hook up wire or the like, since microwave signals are not conducted between the antenna and the meter data storage apparatus.

A second embodiment of an antenna 130, shown in FIG. 5 presents a mechanical construction which simplifies manufacturing of the antenna and reduces costs associated with the manufacturing and the packaging of the antenna. The transmit and receive sections of the antenna are formed as a substantially unitary structure, which can be stamped out of a sheet of aluminum, brass, copper or some other suitable material. Receive section 131 of the antenna 130 has a reflector element 101, a driven element 102, and a pair of director elements 103, 104, integrally formed on a common central boom or support member 105 which serves as a reference element for the antenna.

The transmit section 132 of the antenna 130 includes six elements 11–116. A reflecting element 111 is formed integrally with the boom 105 and located between elements 101 and 102 of the receive portion 131 of the antenna 130. Elements 113 and 114, which serve as director elements of the transmit antenna portion also formed integrally with the boom 105 are located between elements 102 and 103. Elements 115 and 116 which also serve as director elements are formed integrally with the boom 105 and are located between elements 103 and 104, of the receive portion of the antenna.

The driven element 112 is formed as a separate element of the antenna 130 to provide electrical separation between the driven elements of the antenna. The driven element 112 is positioned approximately a quarter inch above the integrally formed elements 101–104, 111, 113–116 to increase the sensitivity of the antenna and to improve the transmission characteristics of the antenna 130.

The boom 105 is the same length as boom 70 of the antenna shown in FIG. 4. Moreover, the lengths of the elements 101–104 of the receive section of the antenna are the same as the lengths of the elements 71–74 of the antenna shown in FIG. 4, and elements 111–114 of the receive section are the same lengths as elements 80–84 of the transmit section of the antenna shown in FIG. 4.

Element 115 is about 5 percent shorter in length than element 114 and element 116 is about 5 percent shorter in length than element 115.

A varactor diode 135 is connected between the driven element 112 of the transmit section and the driven element 102 of the receive section. The anode of the diode is connected to the transmit driven element 112 at a point approximately one-half inch from the center of the boom 105, and the cathode of the diode 135 is connected one inch from the center of the boom 105.

Electrical connections to the antenna are provided through a conductor 120 connected to the driven element 112 of the transmit element through a resistor 121, and a second conductor 122 connected through a resistor 123 to the boom 105 of the antenna 131. A capacitor 124 is connected between conductors 120 and 122. The conductors 120 and 122 extend to the output circuit 43 of the data readout circuits 44 (FIG. 1).

The antenna assembly is housed in a case (not shown) which is of a material, such as cellular plastic, which will permit reception and transmission of signals through the case with negligible attenuation of the signals.

The antenna assembly is mounted in a high place such as in an attic, or under eaves or near the roof of the building in which the meter being read out is located so as to be able to receive the signals transmitted from the mobile unit without obstruction by objects on the ground.

Variable Capacitance Diode

Referring again to FIG. 1, the interrogate signals received at the transponder 23 from the mobile unit 22 are directed to the terminating impedance 34 by the antenna 31, and are thus impressed across the varactor diode 35 to establish a flow of current through the diode 35.

The varicap diode 35 is a semiconductor junction device having a junction capacitance which varies inversely with applied voltage as long as the diode is reverse biased. That is to say, an increase in the amplitude of an applied signal will cause a corresponding decrease in junction capacity and vice versa. In operation, the N-side and the P-side of the varactor diode act as capacitor plates and the junction depletion area as the capacitor dielectric. The depletion area will vary in width depending upon the amplitude of the signal applied and as a function of the reverse bias voltage applied. Thus, a change in signal amplitude changes the distance between the capacitor plates, and thereby changes the value of capacitance of the capacitor.

A commercially available varactor diode suitable for this application is manufactured by Hewlett Packard under the catalogue number HP 5081-2800.

The variation in the anode-to-cathode capacity of the device presents a non-linear loading and consequently a non-linear transmission characteristic for the antenna system 30, thereby causing distortion of received interrogate signals and the generation of harmonics of the interrogate signals. This voltage-variable capacitor device 35 is thus used to generate harmonics and in particular to generate the second harmonic 1,830 MHz of the 915 MHz interrogate signal transmitted from the mobile unit. The transmit antenna of the transponder is tuned to 1,830 MHz and is operative to radiate the second harmonic signals generated back to the mobile unit.

The signal level of the harmonic signals generated is a function of the magnitude of the reverse bias applied to the varactor diode. The operating conditions for the varactor diode 35 are shown in FIG. 6 which provides a plot of the magnitude of the harmonic signal level vs. bias voltage for the diode. As can be seen from FIG. 6, at approximately one volt reverse bias, the amplitude of the harmonic signals generated is approximately −35 db. When a reverse bias of approximately −12 volts is applied to the diode, the corresponding harmonic signal level is approximately −60 db, for a drop of approximately 25 db. From the operating characteristic, shown in FIG. 6, it is apparent that the signal level of the harmonics generated is controllable by a selective application of reverse bias voltage to the diode.

The reasons for the change in the signal level of the harmonics with respect to reverse bias is related to the fact that the change in capacity of the diode junction at large reverse bias values is smaller, and accordingly there is less chance of the harmonics being generated.

It is pointed out that the application of a forward bias to the varactor diode 35 provides little additional benefit. The harmonic signal level is changed by only about 5 db when such forward bias is approximately 6 volts. Moreover, using forward bias for the diode could necessitate the use of current limiting resistance since the diode conducts current when it is forward biased. Accordingly, a bias ranging between −1 and −12 volts is used to control the impedance of the diode.

Meter Data Encoding

As noted heretofore, the reverse dc bias which is applied to the varactor diode 35 to effect modulation of the second harmonic reradiated by the antenna system is controlled by data bits which respresent the reading on the register of the meter associated with the transponder and the data bits which represent the meter identification number.

The meter data is obtained from the meter 21 through the use of an encoder 49 and fed to meter data storage circuit 41 for application by data readout circuit 44 and driver 43 to diode 35. In one embodiment, the encoder 49 comprises an electromechanical sensing element which is adapted to monitor the revolutions of a shaft 50 associated with a register dial 51 of the meter 21 for providing pulses at the output of the encoder 49 which represent a quantum of a commodity measured by the meter. For purposes of illustration, it is assumed that the meter 21 is used for measuring the consumption of the electrical power which a load draws from a power source over an AC power line.

The meter has dials 51–53 which indicate 10 kilowatt hour, 100 kilowatt hour, and 1000 kilowatt hour increments, respectively. The sensing device 49 is associated with the shaft 50 of the 10 kilowatt hour dial 51.

An electromechanical sensing device for converting revolutions of a meter dial shaft, such as shaft 50, into usable data pulses is shown in the application of Dale F. Becker, U.S. Ser. No. 829,160, filed May 26, 1969, now U.S. Pat. No. 3,646,539. The patent is assigned to the assignee of the present invention. The sensing device of the Becker patent provides pulses of direct current which reverse in polarity for each quantum of a commodity measured by the meter. In the present example, ten polarity reversals are provided for each complete revolution of the indicator shaft 50 of the 10 kilowatt hour dial 51.

Briefly, the electromechanical sensing device of the Becker patent includes a disc mounted on a shaft to be rotated as the meter measures commodity usage. The disc has a conductive surface segmented to provide discrete areas of conductive material. Contact members riding on the conductive surface selectively engage predetermined conductive segments as the disc is rotated, such that the disc and the contact members operate as a double-pole double-throw switch. The switch is connected in a circuit such that DC pulses which reverse in polarity each time a quantum of the commodity is measured are provided as the disc rotates with the shaft.

Meter Reading Data Storage Circuits

The manner in which such structure is used in one specific embodiment of a storage and readout circuit is set forth in FIG. 7. As there shown, the encoder 49 is represented as a double-pole, double-throw switch 205 having a first movable contact 206 shown to engage a pole 207 which is connected to ground, and a second movable contact 208 which is shown to engage a pole 209. When the switch is operated, movable contact 206 will be moved to engage a second pole 210, and movable contact 208 will be moved to engage a pole 211 which is connected to ground.

In operation the encoder switch 205 provides logic inputs for the pulse counter 45 of the meter reading data storage circuits 41, the ground condition on poles 207 and 211 representing a logic 0, and the ungrounded condition on poles 208 and 210 representing a logic 1.

In the exemplary illustration, it is assumed the meter reading data is encoded into 12 bits of the 58 bit binary word. Accordingly, the pulse counter 45 comprises three, 4-bit binary counter stages 215–217 connected in tandem and a flip-flop input stage 220, having its output connected to the input of the first counter stage 215. A commercially available 4-bit pulse counter is the type SN 74L93N manufactured by Texas Instruments. The counter input stage may comprise a pair of NAND gates, such as the commercially available type S N 74L00N manufactured by Texas Instruments. The manner of interconnecting the NAND gates to provide a flip-flop is well known in the art.

Operating potential for the three register stages 215–217 and for the flip-flop 220 of the pulse counter 45 is provided by a battery 223 so that the pulse counter which register the data representing the meter reading will be continuously powered in the event of an electrical power failure. Accordingly, in such an event, the contents of the pulse counter register 45 will not be changed.

The battery 223 receives a trickle charge from a charging circuit 224 which is powered from the AC power line.

The binary counter provides 12 outputs RD0–RD11 which provide logic signal levels which represent the binary coding for the number of reversals in polarity of the pulses provided by the encoder 49.

The movable contact 206 of the switch 205 is connected over lead 212 to a first input S of the flip-flop 220 and the movable contact 208 of switch 205 is connected over lead 213 to a second input R of flip-flop 220.

As the encoder switch 205 is operated in response to the measurement of each quantum of the commodity consumed, ten kilowatt hours in the exemplary illustration, lead 212 which is connected to movable contact 206, alternately engages the grounded pole 207 and the ungrounded pole 210 such that logic 0 and logic 1 levels, respectively, are applied to input S. Similarly, lead 213, connected to movable contact 208, alternately engages ungrounded pole 209 and grounded pole 212 such that logic 1 and 0 levels, respectively, are applied to input R.

The state of the flip-flop 220 is reversed with each change in the polarity of the logic levels provided by the encoder 49 and the output of the flip-flop 220 steps the first stage of the binary counter 45 each time the output of the flip-flop 220 goes from a logic 1 to a logic 0 level.

Thus, the pulse counter 45 is stepped as a function of the number of reversals in the polarity of the pulses provided by the electromechanical encoder 49 and the signal levels on the outputs RD0–RD11 of the counter will represent the binary coding of the number of such polarity reversals.

The counter outputs RD0–RD11 are individually connected to inputs E0–E11, respectively, of the multiplexer circuit 46 to permit serial readout of the meter reading data stored by the pulse counter 45. The multiplexer 46 comprises a number of gating circuits responsive to steering signals provided on inputs EA–ED of the multiplexer 46 by the data readout circuits 44 to allow the binary logic signal levels on inputs E0–E11 to be passed to the output EW of the multiplexer 46 and over lead 232 to an input of a NAND gate 235.

As will be shown, the multiplexer 46 in the meter reading data storage apparatus 41 is operative, as enabled by the data readout circuit 44 to effect readout of the most significant digit first (that is, the digit appearing on input E0, is readout first, and the digit on input E11 is read out last). As will be further described, the steering signals provided on inputs EA–ED of the multiplexer 46 are effective to cause serial readout of the data only when an enable signal is provided on the enable input EN of the multiplexer circuit 46 by the data read out circuit 44. A commercially available multiplexer circuit suitable for this application is the type S N 74150N manufactured by Texas Instruments.

Output Drive Circuit

As indicated above the NAND gate 235 is selectively enabled by the data readout circuit 44 to at times transmit the outputs of the meter data storage circuit 41 to output drive circuit 43 and at other times to transmit the output of meter address data storage circuit 42 to the output drive circuit.

The output of the NAND gate 235 is connected to the base of a transistor 236 of the output drive circuit 43 which in turn is connected over network 43a to control the condition of varactor diode 35. The emitter of transistor 236 is connected to ground through a diode 239. The collector of transistor 236 is connected through a resistor 237 to a potential VA. The potential VA, which is 12 volts in the present illustration, is derived from the AC power line by a power supply circuit 238.

The collector of transistor 236 is further connected through the lumped inductance L1' of the network 43a to the cathode of the varactor diode 35, and the anode of the varactor diode 35 is connected through the lumped inductance L2' of the network 43a to ground.

When the output NAND gate 235 is enabled to provide a logic 0 or ground level at its output, the output drive transistor 236 is turned off and the collector of the transistor 236, and thus the cathode of the varactor diode 35, are at a potential of approximately 12 volts to provide a reverse bias of approximately 12 volts for the varactor diode 35. As has been mentioned in the foregoing description with reference to FIG. 6, whenever the varactor diode is at 12 volts reverse bias, the generation of harmonic reply signals at the 1,830 MHz rate will be inhibited, and such absence of harmonic signals for radiation to the mobile unit will represent logic 0 data levels. When NAND gate 235 is disabled by a logic 1 output from the meter data storage apparatus 41, the meter address apparatus 42, or the data readout circuits 44, transistor 236 will be turned on, providing a voltage level of approximately $-1$ volt at the cathode of the varactor diode 35. In this condition (a reverse bias of about 1 volt), harmonic reply signals will be generated at the 1,830 MHz rate to represent the logic 1 data levels.

Meter Address Data Storage Circuits

The output of the meter address storage circuit 42 is selectively read out by data readout circuit 44 over NAND gate 235 to the output drive circuit 43 in a similar manner. That is, the meter address storage circuits 42 are prewired in each meter to provide a set of binary coded logic outputs which represent an address which is discrete to the associated meter. In the illustrated embodiment, the meter address or identification number is a five digit decimal number represented by a sixteen bit binary coded word.

A multiplexer circuit 48 which is used to store the meter address or identification data circuits 42 is similar to the multiplexer 46 of the meter reading data storage circuits 41 and may also be, for example, the commercially available type S N 74150N manufactured by Texas Instruments.

The multiplexer 48 has sixteen inputs F0–F15 each of which are connected either to ground (logic 0) or to the voltage VA (logic 1) to provide a representation of the binary coding for the meter identification number. The multiplexer circuit 48 includes logic gates controlled by the steering signals provided on inputs FA–FD of the multiplexer 48 to permit serial readout of the meter address data by gating the logic levels on inputs F0–F15 to the multiplexer output FW. The most significant digit, the digit represented by the logic level on input F0 is read out first and the logic level on input F15 is read out last.

The steering inputs which are provided by the data readout circuits 44 are effective only when an enabling signal, also provided by the data readout circuits 44, is present on the multiplexer enable input FN.

The output FW of the multiplexer 48 is connected over conductor 242 to an input of NAND gate 235 for controlling the biasing for transistor 236 of the output drive circuit 43 to provide $-1$ and $-12$ reverse bias levels for the varactor diode 35 in the manner described above.

The meter address data provided by the meter address storage circuits 42 is read out prior to the reading out of the meter reading data provided by the meter reading data storage circuits 41. The sequencing of the data readout is provided by the data readout circuits 44 as will now be shown.

Data Readout Circuits

The 16 bit meter address data stored in the meter address storage circuits 42 and the 12 bit meter reading data stored in the meter reading storage circuits 41 are read out by the data readout circuits 44 which control the multiplexer circuits 46 and 48 respectively. The data in each case is read out serially a bit at a time under the control of the readout circuits 44.

The readout circuits 44 include three pulse register circuits 241, 245 and 249 which are responsive to pulses provided by the clock pulse generator 56 to effect word generation each of which is comprised of 29 time slots, one time slot for each of the 28 data bits to be read out, and a further time slot in which a start of message code is provided. Each of the 29 time slots is subdivided into four sub time slots by register circuit 241.

A commercially available circuit for the pulse register circuits 241, and 249 is the type S N 7473N Dual Master/Slave flip flop circuit manufactured by Texas Instruments. Pulse register circuit 245 may be a type S N 7493N counter also manufactured by Texas Instruments. Such circuits have a set input and provide four outputs representing the set and reset outputs of the master and slave flip flops which comprise each pulse register circuit.

The clock pulse generator 56 comprises an oscilator tuned to generate clock pulses at a 3,420 Hz frequency rate. The oscillator power from the AC power line through the power supply circuit 238.

a. Time Slot Generator

Circuit 241 divides the clock pulse rate at 3,420 Hz four providing an effective pulse rate of 855 Hz for the data readout circuits 44. The pulse divider circuit has four stable states which are shown in the Truth Table given in FIG. 8.

During the four states of the pulse rate divider circuits 241, the circuit 241 provides four sets of control signals at outputs Q1–4 for controlling NAND gates 251, 252, 255 of the data readout circuits 44 to provide a set of pulses, such as are shown in FIG. 9, at time slots 1–28 during which the data is being read out of the meter address data storage circuits 42 (slots 1–16) and the meter reading data storage circuits 41 (slots 17–28).

The pulses provided during readout of the meter data include a sync pulse and a data pulse which may be either a logic 1 or a logic 0 as determined by the data bit read out in the time slot.

During the time slot 29, the data readout circuits 44 generate a start of message code, shown in FIG. 9A, consisting of three logic 1 levels followed by a logic 0 level.

The start of message code with its three successive logic 1 levels is distinguishable over all of the sets of pulses provided during the readout of the meter reading data storage circuits 41 and the meter address data storage circuits 42. Accordingly the start of message code provides a distinct set of signals recognizable at the mobile unit as the beginning of a message indicating that the next 16 groups of signals (time slots 1 through 16) represent the meter address data and the 12 groups of signals (time slots 17 through 28) represent the meter reading data.

b. Steering Signals For Multiplex Circuits 46, 48

The pulse register circuit 245 controlled by the pulse divider circuit 241 provides 16 sets of logic signals on outputs A–D which outputs serve as steering signals for the two multiplexer circuits 46 and 48. The pulse register circuit 245 is stepped each time the signal level on output Q3 of the pulse rate divider circuit 241 goes from a logic 1 level to a logic 0 level. This occurs in the transition from the fourth state to the first state of circuit 241 as can be seen in the Truth Table of FIG. 8.

The steering signals are applied to the inputs EA-ED and FA-FD selectively to control the enabled one of the multiplexer circuits 46 and 48 to serially gate th binary data on inputs E0-E11 of multiplexer 46 or the binary data on inputs F0-F15 of multiplexer 48 as the case may be to NAND gate 235 to effect control of the amount of reverse bias provided for the varactor diode 35.

The selective enablement of the multiplexer circuit 48 during time slots 1–16 and the multiplexer 46 during time slots 17–28 is effected by the third pulse register circuit 249 which selectively enables gates 253 and 254 in the provision of an enable signal for the meter address multiplexer circuit 48 and the meter data multiplexer 46 at such time slot respectively, to permit the steering inputs to be effective to readout the meter data. The pulse register circuit 249 has its set input connected to the output of the sixteen count register 245. Circuit 249 changes state each time the register counter 245 steps from a count of 15 to a count of zero. In the reset condition, circuit 249 enables gate 253 to enable the meter address data multiplexer 48. When the circuit 249 is set, gate 254 will be enabled to enable the meter reading data multiplexer circuit 46.

Whenever counter 245 reaches a count of 13 while circuit 249 is set (i.e., a total count of 29) counter 245 will be reset to a count of zero by a reset signal provided by a reset circuit comprising a one-shot 257 which is controlled by a NAND gate 258 having inputs connected to outputs of the counter register 245 and the flip-flop 249.

Operation of the Data Read Out Circuits

In order to illustrate the operation of the data read out circuits 44, it is assumed that the pulse rate divider register 241 is initially in the first state shown in the Truth Table (FIG. 8) having logic 0 levels on outputs Q1 and Q3 and logic 1 levels on outputs Q2 and Q4. The pulse count register 245 is at a count of zero (corresponding to time slot one) with logic 0 levels on out-puts A–D and that the pulse flip-flop register 249 is reset, having a logic 0 level on output T2, and a logic 1 level on output $\overline{T2}$.

During the first state of the pulse rate divider circuit 241, the logic 1 levels on outputs Q2 and Q4 will enable gate 251 providing a logic 0 level at the output of gate 251, thereby disabling gate 235. When 235 is disabled, transistor 236 is turned on, providing a +1 volt potential at the collector of transistor 236, and a 1 volt reverse bias for the varactor diode 35. Thus, as shown in FIG. 9, a logic 1 level sync pulse will be provided at the start of the time slot.

With the receipt of the next pulse from the clock pulse generator 56, the pulse rate divider circuit 241 will step to its second state to provide the outputs shown in the Truth Table of FIG. 8, that is logic 1 levels at outputs Q1 and Q4, and logic 0 levels at outputs Q2 and Q3. Accordingly, gate 251 will be disabled, enabling gate 235, turning off transistor 236, and causing a reverse bias of −12 volts to be applied to the diode. Accordingly, as shown in FIG. 9, a logic 0 level follows the sync pulse.

The next pulse from the clock pulse generator 56 will cause the pulse divider circuit 241 to step to its third state to provide logic 1 levels at outputs Q2 and Q3, and logic 0 levels at outputs Q1 and Q4 as shown in the Truth Table of FIG. 8. Consequently, gate 253 is enabled to provide a signal for enabling the meter address storage multiplexer 48 such that the steering signals provided on multiplexer inputs FA-FD are effective to gate the logic signal level on one of the address multiplexer inputs F0-F15 to the meter address multiplexer output FW. Under the initial conditions assumed in which the pulse count register circuit 245 is at the count of zero and the register circuit outputs A-D are at logic 0 levels, selected gates of the meter address multiplexer 48 will be enabled to gate the logic signal level on meter address multiplexer input F0 to the output FW to enable or disable gate 235 depending on whether the logic level on input F0 is a logic 0 or a logic 1 level, respectively. It is pointed out that the multiplexer 48 provides an inversion of the logic levels on inputs F-F15.

Referring again to FIG. 9, during the third state of the pulse divider circuit 241, either a logic 0 level or a logic 1 level, representing a data bit read out, will be provided in accordance with the state of gate 235 which is controlled by outputs of the meter address data multiplexer circuit 48 and the meter reading data multiplexer 46.

As pulse divider circuit 241 is stepped to state four by the next clock pulse, gate 253 will be disabled to render the steering inputs ineffective. In addition gate 251 will be disabled by the logic 0 level on output Q4 of the pulse divider circuit 241, to enable gate 235 to provide the logic 0 level shown in FIG. 9 to come after the data pulse.

As the pulse divider circuit 241 is stepped from state four to state one in response to the next clock pulse, the logic level on output Q3 will go from a logic 1 level to a logic 0 level causing the pulse count register circuit 245 to step from a count of zero to a count of one, providing a logic 1 level on output A and logic 0 levels on outputs B–D of the pulse count circuit. The count of one for pulse count circuit 245 corresponds to time slot two.

During time slot two, the second data bit will be read out of the meter address data storage circuits 42. A similar sequence of operations will be provided as the pulse rate divider circuit 241 is again stepped in succession from state one to state four. During this second set of operations, the logic level on multiplexer input F1 will be gated to the output FW to control gate 235, and the bias on the varactor diode 35.

The counter register 245 will be stepped each time the pulse divider circuit goes through its four states from a count of zero to a count of fifteen, providing time slots 1 to 16, and reading out the 16 data bits from the meter address storage circuit 42 a bit at a time.

As the counter 245 is stepped from a count of 15, back to the initial count of zero, the logic 1 on output D of pulse count register circuit 245 will go from a logic 1 level to a logic 0 level and will set pulse flip-flop register circuit 249 providing a logic 1 level at output T2 and a logic 0 on output $\overline{T2}$.

The logic 1 level on output T2 of pulse flip-flop 249 enables gate 254 to be responsive to the logic 1 levels provided by the pulse rate divider circuit 241 during the third state of the pulse divider circuit 241 to permit readout of the logic levels on inputs E0–E11 which represent the meter reading data.

Thus, as the pulse count circuit 245 is stepped from a count of zero to a count of 11 while the pulse flip flop 249 is set, the gates of the meter reading data multiplexer 46 are selectively enabled to gate the logic levels on inputs E0–E11 to the multiplexer output EW for controlling gate 235 and thereby the amount of reverse bias applied to the varactor diode 35. The first 12 counts provided by the pulse count circuit 245 while the pulse flip flop is set establish time slots 17 through 28. During these time slots, the 12 data bits which represent the meter reading will be read out a bit at a time.

As the pulse count register circuit 245 steps from a count of eleven to a count of 12 while flip flop 249 is set (time slot 29) gate 255 will be enabled by the logic 1 levels at the output T2 of pulse flip flop register 249 and at the outputs C and D of the pulse count register circuit 245. Accordingly, during time slot 29, gate 255 will follow the output of gate 252 which is controlled by the pulse rate divider circuit 241.

Referring to the Truth Table given in FIG. 8, it is seen that logic 0 levels are provided on either of output Q2 and Q3 during states one, two and three so that gate 252 will be disabled. During the fourth state of circuit 241, logic 1 levels are present on outputs Q1 and Q3 to enable gate 252. Thus, a pulse train (FIG. 9A) comprised of three logic 1 levels followed by a logic 0 level is provided during time slot 29. This is used as a start of message pulse code. The "three-length" pulse enables gate 255 for the first three states of pulse divider circuit 241 to disable gate 235 during that time and to enable gate 235 during the fourth state of the circuit 241. The logic levels provided at the output of gate 235 turn on transistor 236 during the three successive logic 1 pulses and turn the transistor 236 off during the logic 0 pulse and control the reverse bias applied to the varactor diode 35 accordingly.

When the pulse count register 245 is stepped to a count of 13 while flip flop 249 is set, gate 258 of the reset circuit will be enabled, to enable the one-shot circuit 257 which provides a reset signal on lead 259 for resetting the pulse count register 245. When the pulse count register 245 resets to zero, the pulse flip flop register 249 is also reset, and the pulse register circuits 241, 245 and 249 assume the initial conditions such that the meter reading data can be read out again.

System Operation

Referring to FIG. 12, a plurality of meters at locations M1–M5 are interrogated or read out when interrogate signals (915 MHz) generated from a mobile unit 22, are received at the meter locations. The mobile unit is driven in a path indicated by the dotted arrow, being driven past the meter locations M1–M5 to permit interrogate signals to be directed toward the meters.

Whenever the beam width $\phi 1$ of the mobile unit transmitting antenna 28 aligns with the receiving beam width $\phi 2$ of a meter transponder, such as the meter transponder at location M1, the information available at the meter will be read out and radiated back to the mobile unit.

The mobile unit 22 continuously generates interrogate signals at the 915 MHz rate, for radiation via the mobile unit transmit antenna 28 in the direction of the meter locations M1–M5.

Assuming the meter at location M1 is meter 21 and the corresponding transponder 23 shown in FIG. 1, when the antenna pattern of the mobile transmit unit 22 aligns with the antenna pattern of the transponder receive antenna 31, the interrogate signals transmitted from the mobile unit 22 will be received at the transponder 23 and modulated in accordance with the data provided by the meter reading data storage circuits 41 and the meter address data storage circuits 42. The interrogate signals received act as RF carriers to be modulated in accordance with the data provided at the meter location, and the interrogate signals are reradiated to the mobile unit 22.

The clock 56 is continuously running, and therefore the data stored in the reading data circuit 41 and the address data circuits 42 will be periodically fed to the output drive circuit 43 to effect corresponding changes in the bias of the varactor diode 35. The data is thus continuously available to vary the bias on the diode 35 whether or not the meter is being read out. However, such data is not effective to cause transmission of information from the meter location until the interrogate signals which serve as a carrier for the data are received from the mobile unit 22. The bias signals are fed to the transponder diode 35 at a low power level, and the varactor diode 35 transponds only when the interrogate signals are received, that is, when the antenna patterns of the mobile unit 22 aligns with the antenna pattern of the transponder 23.

The interrogate signals are received between the two sections 31 and 32 of the transponder antenna 30 and are impressed across the varactor diode 35 which forms the terminating impedance for the antenna 30. As the RF interrogate signal swings peak-to-peak through each cycle, the change in amplitude of the signal effects a corresponding change in the impedance characteristic of the diode 35, thereby effecting the generation of harmonics including the second harmonic (1,830 MHz) of the received signal.

The amplitudes of the harmonic signals thus generated are varied in accordance with the bias levels provided by the data readout circuits 44.

In one embodiment, the first information recognized at the mobile unit as being transmitted will be the three logic 1 pulses which form the start of message code, which is indicative of the start of a train of data pulses. Each of the first three pulses will cause a signal level of approximately −1 volts to be applied between lead 36 and 37 applying approximately −1 volt reverse bias to the varactor diode 35. Accordingly, the RF signals at the 915 MHz rate, received at the transponder antenna 30 will be distorted creating second harmonics of the signals, the amplitudes of the signals being at a level of approximately −35 db (see FIG. 6).

Since the clock 56 is free running, the transmission of data may start during any one of the 29 time slots. However, such data will be provided without incident until the start code is generated at time slot 29. The start code will be recognized at the mobile unit as the beginning of a data train indicating a readout from the meter.

Thus, the first time a count of 28 is reached after the antenna patterns align and the interrogate signals are received at the transponder, gate 252 (FIG. 7) will be enabled to control gate 255 and thereby gate 235 to provide the three length start of message code shown in FIG. 10 at time slot 29. The logic levels which comprise the start of message code are effective to control the transistor 236 of the output drive circuit 43 to reverse bias the varactor diode at −1 volts to provide the signal burst at 1,830 MHz for three consecutive pulse widths as shown in FIG. 11.

The signals representing the start of message code will be radiated to the mobile unit 22 via the transmit section 32 of the transponder antenna 30.

The signal will be received at antenna 29 of the mobile unit and will be passed to the receiver 26 which provides logic levels for translator 27 representing the received signals. When the start of message code is detected the mobile unit translator circuits 27 will be conditioned to accept and store the meter reading data to be transmitted during the next 28 time slots.

The first data to be read out are the 16 data bits which comprise the binary coding for the meter address or identification number. For purposes of illustration it is assumed that the number is 00327 which is represented in binary coding as the data word 0000000101000111.

As has been pointed out, the most significant digit, that is the logic 0 which is the first bit of the 16 bit data word, is read out first. Thus, during the first time slot when the pulse count register 245 is at a count of zero, the data readout circuits 44 will provide a sync pulse shown as the first pulse in the logic pulse train of FIG. 10 which represents the output of gate 235. The logic 1 sync pulse will control the output drive circuit 43 to provide a reverse bias of −1 volt for the varactor diode 35 between conductors 36 and 37 so that the 915 MHz interrogate signals received at the transponder 23 will be distorted providing second harmonic signals (1,830 MHz), as shown in FIG. 11, which are radiated to the mobile unit 22.

Similarly, during the first time slot, the logic 0 level on input F0 of the meter address multiplexer circuit 48 will be read out providing the logic 0 level in the first time slot as shown in FIG. 10. The logic 0 level will cause a reverse bias of −12 volts to be applied to the diode 35 such that the harmonics of the interrogate signal will not be generated as shown in FIG. 11, thereby indicating a logic 0 is transmitted to the mobile unit.

The remaining 15 data bits of the meter address on inputs F1–F15 of the multiplexer 48 are read out one at a time during time slots 2 through 16 controlling the bias on the varactor diode 35 to modify the interrogate signals in accordance with the level of each data bit.

As has already been described, after the sixteen meter address data bits have been read out, the pulse count register circuit 245 (FIG. 7) will be stepped from a count of zero to a count of 11, effecting readout of the 12 meter reading data bits on inputs E0–E11 of the meter reading data multiplexer 46.

By way of illustration, it is assumed that the meter reading data as indicated by the meter dials 53–51 is 3,200 kilowatt hours. The units digit is not transmitted, and accordingly by this time the meter encoder 49 has provided 320 pulses so that the pulse counter 45 stores 12 bits 000101000000 which represent the binary coding of 320. Thus, the logic levels on respective outputs RD11 to RD0 and correspondingly on inputs E0–E11 of the meter reading data multiplexer 46 are 000101000000.

At time slot 17, a sync pulse (FIG. 10) will be provided at the output of gate 235 by the data readout circuits 44. Also, during time slot 17 the first data bit on input E0, a logic 0, of the 12 bit data word is read out providing a logic 0 level at the output of gate 235.

The logic 1 levels provided during time slot seventeen will control the output driver circuit 43 to effect the generation of the harmonic signals as shown in FIG. 11. These signals at the frequency rate of 1,830 MHz will be radiated to the mobile unit as they are generated.

The remaining 11 bits on inputs E1–E11 of the multiplexer 46 will be read out one at a time during time slots 18 through 28, respectively. At time slot 28, the data bit, a logic 0 level, on input E11 will be read out providing the logic 0 level at the output of gate 235, shown at time slot 28 in FIG. 10, and this output will control the output drive circuit to provide the harmonic signals representing the sync pulse during time slot 28.

After the data has been read out, the clock pulse generator 56 which runs continuously will again be effective to generate the start of message code during time slot 29 and read out the information from the meter reading data storage circuits 41 and the meter address data storage circuits 42 in the same sequence as described, effecting amplitude modulation of the second harmonics generated to correspondingly code the harmonics being generated responsive to interrogate signals to represent the data provided by the meter reading data storage circuits 41 and the meter address data storage circuits 42. Such read out of meter 21 will continue as long as the antenna patterns of the mobile unit antenna 28 and the transponder antenna 30 align.

As the mobile unit 22 continues to move along the path indicated by the dotted arrow shown in FIG. 12, the antenna patterns for mobile unit 22 and transponder 23 at location M1 eventually will no longer align although the transponder will continue to function, modifying the bias on the varactor diode 35, the information will not be transmitted to the mobile unit.

When the antenna pattern of the mobile unit 22 aligns with the antenna pattern of the meter transponders at locations M2–M5 in succession, the meter reading data from the meter at locations M2–M5 will be transmitted to the mobile unit as described with reference to meter 21 at location M1.

Multiple Meter Readout From A Single Location

Referring to FIG. 13, there is shown an embodiment of a remote meter reading system in which a single transponder 23a is connected to automatically read out a plurality of meters, such as the eight meters 21a–21h shown in the exemplary meter group A, and to provide signals which include such information to a mobile interrogate unit.

Each meter, such as meter 21a, of meter group A has associated therewith (in the manner of the single meter embodiment of FIG. 7) an encoder, such as encoder 49a, a pulse counter, such as counter 45a, and a meter reading data multiplexer, such as multiplexer 46a, which reads out from the pulse counter 45a, the 12 bit data word representing the reading on the associated meter 21a.

A single transponder 23a is operative with data readout circuit 44 to effect sequential readout of the information provided by the meters 21a–21h in such group. Transponder 23a includes an address multiplexer 48a, and a meter select multiplexer 320 which are operative with (and controlled by) data readout circuit 44 to cyclically provide data words which indicate the identity of each meter selected in the group and the information registered on such meter. As in the single meter embodiment of FIG. 7, each word has 29 time slots including a first time slot 0 for sync purposes, time slots 1–16 for meter identity purposes and time slots 17–28 for the data information registered on the selected meter. In multiple meter installations, it may be desirable to provide a word transmission rate of a higher frequency. In one embodiment of the type shown in FIG. 13, an oscillator having a frequency of 9,280 Hz was used for the clock 56.

The address multiplexer 48a, as will be shown, provides 16 bits for the time slots 1–16 of each word which identify the meter selected and the meter selected multiplexer 320 provides twelve bits during time slots 17–28 which represent the data provided by the selected one of the meters. The twelve bits for each meter are continuously fed to the inputs J1–J8 of the meter select multiplexer 320 by the meter data multiplexers 46a–46h selective readout by the meter select multiplexer 320.

The meter of the group of eight meters 21a–21h selected for readout is determined by the signal output of a pair of counters 321, 322 which is connected over conductors 324–326 to the select inputs JA–JC of the meter select multiplexer 320. In addition, the signal output of the counters 321, 322 is also connected to three marking terminals F13–F15 on multiplexer 48a to identify thee meter of group A which is being read out (the markings on the first 13 terminals F0–F12 are prewired and are therefore the same for all eight meters 21a–21h in the group). This one set of signal effects meter selection and meter identification.

Circuit 321 comprises two JK flip flops and the input flip flop A of circuit 322 (which comprises four JK flip flops), and as will be shown effectively acts as a pulse divider to divide the data readout cycle by eight to thereby enable individual readout of each of the eight meters 41a–41h. In addition, the three flip flops B–D of circuit 322 provide a count of five before circuit 322 is reset, with the result that each of the meters 21a–21h will be selected in order, and as selected the information for the selected meter will be read out five times.

A total readout of the eight meters will therefore require 40 word generation cycles by the data readout circuits 44.

Circuit 321 over outputs A and B and circuit 322 over output A provide eight sets of three logic levels for select steering inputs JA–JC of the meter select multiplexer 320 to enable selection of a path from one of the multiplexer inputs J1–J8 to the multiplexer output JW. The paths are selected sequentially in accordance with the levels on inputs JA–JC. With selection of a meter, such as meter 21a, the data signals are read out of the meter data multiplexer associated therewith (multiplexer 46a for meter 21a) and are fed over associated inverter 331 and meter select multiplexer 320 to control the drive circuit 43 in the biasing of the varactor diode 35, and the transmission of the meter reading data to the mobile unit in the manner set forth in the description relating to FIG. 7.

As noted above, the select steering signals provided by circuits 321 and 322 are also used as variable inputs F13–F15 to the meter address storage multiplexer 48a, which as enabled during time slots 1–16 of each word transmits the 13 bits premarked on inputs F0–F12 with the three bits marked on inputs F13–F15 by counters 321, 322.

The meter select multiplexer may be a multiplexer available from Texas Instruments as S N 74150N, and counter circuits 321, 322 may be of the type available from Texas Instruments as SN 7473N and SN 7490N respectively.

Operation of Multiple Readout Circuits

The operation of the multiple meter readout circuit, shown in FIG. 13, is basically similar to the operation of the readout circuit shown on FIG. 7, and accordingly certain portions of such description are not repeated hereat.

It will be recalled that the data readout circuit 44 is driven by clock 56 to generate words in a cyclic pattern each of which words has 29 time slots. One time slot is used for a start of message code, 16 time slots (1–16) are used to identify the meter selected, and twelve slots (17–28) are used to provide the meter reading information. During time slots 1–16, data readout circuit 44 provides an enabling signal over conductor FN to enable the meter address multiplexer 48a, and during time slots 17–28, data readout circuit 44 provides an enabling signal over path JN to the meter select multiplexer 320. During each word generation cycle (in the illustrated embodiment at the end of time slot 16) data readout circuit 44 provides a signal output over conductor T2 to the divide by five counter 322. After five counts are received over path T2 (i.e., after five words have been generated) the signal output of counters 321, 322 advances one count and at such time a different meter is selected from meter group A.

The manner in which each meter of the eight meters is selected for five successive readouts by the counter 321 in conjunction with counter 322 is now set forth. Assuming for purposes of illustration that the system is in the condition in which the counters 322 and 321 have been reset to zero, logic 0 levels will be placed on conductors 324–326, respectively, to inputs F13–F15 for address multiplexers 48a and to inputs JA–JC for meter select multiplexer 320.

Assuming further that the data readout circuit 44 is initiating a word generation cycle, an enabling signal is placed on output FN during time slots 1–16 of such word to the enable terminal for address multiplexer 48a. As the steering signals are provided by data readout circuit 44 over outputs A–D to the steering inputs FA–FD on multiplever 48a, the prewired bits which are marked on terminals F0–F12 and the bit marking (000) which is placed on terminals F13–F15 by counters 321–322 are read out serially over output FW in the manner described hereinbefore. The 16 bits as serial outputs over path FW are fed via gate 235 to drive circuit 43 which provides corresponding bias signals for the varactor diode 35 in the manner described heretofore.

As the generation of the word advances to time slot 17, data readout circuit 44 removes the enabling signal from output FN and marks output JN to thereby enable meter select multiplexer 320 to select the one of the meters which is indicated by the signals output from counters 321, 322.

It was assumed that circuits 322, 321 are in the reset condition and accordingly conductors 324–326 have signal levels 000 respectively marked thereon. With such signals input over terminals JA–JC, the multiplexer 320 will connect the first meter input terminal J1 to multiplexer output JW and via gate 235 to the drive circuit 43 for diode 35.

The signals at selected terminal J1 comprise the bit information which indicates the reading on the first meter 21a. The bit information is read out serially from meter reading storage circuit 41a by the A–D steering signals which are applied to steering inputs EA–ED by the data readout circuit 44 during time slots 17–28 of each word. Since input EN for each of the meter multiplexers, such as 46a, are connected to ground, and the A–D steering signals are applied simultaneously to each of the mutliplexers, the information bits for each meter are continuously available at the inputs J1–J8 for meter select multiplexer 320. However, as indicated above, multiplexer 320 is enabled to select the output information from only one meter at a time, and then only during time slots 17–28 of a word.

With completion of the generation cycle for the first word, data readout circuit 44 starts a second word generation cycle and marks output T2 which is connected to the B input of the flip flop BCD in counter 322 which advances one count to mark the second word and therefore the second transmission of information for the selected meter. During the first time slots 1–16 of the second cycle, the meter address for the first meter is once more transmitted and during time slots 17–28 the meter data for the first meter is transmitted.

As the data readout circuit 44 generates five successive words in such manner, the system transmits the meter information and address in such pattern for the first meter 21a five times.

As the last time slot of the word generated in the fifth cycle occurs, the signal on conductor T2 output from the data readout circuit 44 causes the BCD flip flop in counter 322 to restore to zero, and the output from the D flip flop as applied to the A input of counter 322 sets the first stage of counter circuit 322 to provide a logic 1 level at the A output of counter 322. The same logic 1 level output from flip flop A of counter 322 is also applied to the A input of counter 321, but since counter 321 comprises TTL type logic (responsive to logic signal levels going from 1 to logic 0) the state of flip flop 321 is unchanged at this time.

Consequently, with the markings 001 on the steering inputs JC, JB, JA, respectively, for meter select mutliplexer 320, the multiplexer 320 connects the output of the second meter reading data multiplexer 46b (not shown — but connected via an inverter such as 331a to input J2) via terminal J2 to multiplexer output JW and gate 235 to the drive circuit 43 for diode 35.

With such advance of counter 322. the terminals F13–F15 of the meter address multiplexer 48a will now be marked by the three digits 001, respectively, which is the code assigned, in the present example, to the second meter 21b of the group of eight (i.e., the first 13 bits marked on terminals F0–F12 are the same for each of the eight meters). During the sixth cycle of the data readout circuit 44 therefore, the address of the second meter 21b is transmitted along with the information stored in the second meter reading storage circuit 41b for meter 21b.

The circuits 321 and 322 continue to advance in such manner, and after each five words have been generated by data readout circuit 44, the BCD flip flops of counter 322 provide a signal to flip flop A of counter 322 which changes state to change the marking on conductor 324. In addition, each time flip flop A of counter 322 s reset, the logic 0 signal on conductor 324 controls the counter 321 to advance one count. In this manner, after each five cycles of the data readout circuit 44, conductors 324–326 are marked with a different set of signals to effect selection of a correspondingly different one of the meters as shown by the following truth table.

TRUTH TABLE

| Word Generated | | | | | Counter 322 | Counter 322 | | 321 | |
|---|---|---|---|---|---|---|---|---|---|
| | | B | C | D | | A | | A | B |
| Step 1 | (meter 21a data) | 0 | 0 | 0 | | 0 | | 0 | 0 |
| 2 | " | 1 | 0 | 0 | | 0 | | 0 | 0 |
| 3 | " | 0 | 1 | 0 | | 0 | | 0 | 0 |
| 4 | " | 1 | 1 | 0 | | 0 | | 0 | 0 |
| 5 | (meter 21b data) | 0 | 0 | 1 | | 0 | | 0 | 0 |
| 10 | (meter 21c data) | 0 | 0 | 0 | | 1 | | 0 | 0 |
| 15 | (meter 21d data) | 0 | 0 | 0 | | 0 | | 1 | 0 |
| 20 | (meter 21e data) | 0 | 0 | 0 | | 1 | | 1 | 0 |
| 25 | (meter 21f data) | 0 | 0 | 0 | | 0 | | 0 | 1 |
| 30 | (meter 21g data) | 0 | 0 | 0 | | 1 | | 0 | 1 |
| 35 | (meter 21h data) | 0 | 0 | 0 | | 0 | | 1 | 1 |
| 40 | (meter 21a data) | 0 | 0 | 0 | | 1 | | 1 | 1 |
|  |  |  |  |  | | 0 | | 0 | 0 |

With each advance of counters 321, 322 to a higher count and the selection of a correspondingly different meter, the same count is applied to terminals F13–F15 to identify the particular meter which has been selected. As circuits 321, 322 advance to a count of eight, each of the conductors 324–326 will be at the logic 1 levels, and the address and data for the last meter (meter 21h) will be read out five times.

After the fifth read out of the data for meter 21h, circuits 321, 322 reset to provide logic levels 000 on conductors 324–326 and a new cycle is started with meter 21a being selected for read out.

ALTERNATIVE ARRANGEMENTS

It will be apparent that the diode 35 in the system shown in the drawings is connected in series with the input and output sections of the antenna 30. However, the system will work in like manner if the input signals received over the receive section 31 are inductively coupled to a loop which includes the diode 35 and a blocking capacitor connected to transmit section 32 of the antenna, the diode 35 in this case having its cathode connected to the blocking capacitor.

Whereas the translation circuit 27 shown in conjunction with the tape recorder 27' may be a basic storage circuit for temporary storage of received signals prior to recording on the tape associated with the tape recorder 27', it will be apparent that more elaborate data processing systems may be provided in the mobile unit. In one preferred form the input data would be processed by equipment connected between the translator 27 and the recorder 27' so as to be placed in the ASCII code and recorded on the tape in such code whereby the tape as taken to a central office, is compatible for use as a direct input into the computer without interface electronics. In such embodiment the computer will take the information represented by the signals and provide a completed bill for forwarding to the user without the need for attendant help.

In its simplest form, the output of receiver 26 could be directly fed to the tape recorder 27' for receiving purposes.

It is further noted that the encoder unit 49, the meter reading data storage circuit 41 and the meter address data storage circuit 42 are exemplary of circuits which may be used with readout circuits 44 to provide serial bits for controlling signal transmission of information to a remote interrogator by the novel arrangement comprised of the nonlinear impedance means and associated antenna means. It will be apparent that the novel harmonic signal generator of the invention may be used with other forms of encoders and storage devices without departing from the disclosure teachings.

I claim:

1. In a remote meter reading system, a transponder for providing signals which represent data comprising antenna means for receiving input signals of a first frequency, nonlinear impedance means connected to said antenna means operative to distort said input signals to generate related harmonic signals, and data means for providing information representing signals to modulate said harmonic signals prior to transmission to associated equipment.

2. A system as set forth in claim 1 in which said nonlinear impedance means comprises a semiconductor having a p-n junction, the junction capacitance of which varies inversely as a function of the applied signal voltage.

3. A system as set forth in claim 1 in which said data is recorded on register means and in which said data means includes means for providing data bits which indicate the reading recorded on said register means.

4. A system as set forth in claim 1 in which said data is recorded on register means and in which said data means includes means for providing data bits which indicate a discrete identification for said register means.

5. A system as set forth in claim 1 which includes mobile means having interrogation means for transmitting signals of said first frequency to said transponder, and receiver means tuned to the frequency of said harmonic signals.

6. A system as set forth in claim 1 in which said antenna means includes a receive section tuned to receive signals of said first frequency and a transmit section tuned to the frequency of said harmonic signals.

7. A system as set forth in claim 6 in which said data means includes means connected to apply said information signals directly across said nonlinear impedance means.

8. A system as set forth in claim 6 in which said antenna receive section includes a plurality of interconnected signal elements of electrically conductive material, and said antenna transmit section includes a further plurality of interconnected signal elements of electrically conductive material, said nonlinear impedance means being connected between a first signal element of said receive section and a first signal element of said transmit section, and in which said data means include means connected to apply said information signals over at least certain other signal elements of said transmit and receive sections to said nonlinear impedance means.

9. In a remote meter reading system, a transponder for providing signals which represent data recorded on a register comprising input means over which signals of a first frequency are received, nonlinear impedance means connected to said input means operative to distort said input signals to generate relative harmonic signals, data means for applying information signals to said nonlinear impedance means to effect modulation of said harmonic signals with said information signals, and output means connected to said nonlinear impedance means for transmitting said modulated harmonic signals to associated equipment.

10. A system as set forth in claim 9 in which said data means includes first means for providing data bits which indicate the value of the reading on said register.

11. A system as set forth in claim 9 in which said data means includes means for providing data bits which indicate the discrete identity of the transponder.

12. A remote meter reading system as set forth in claim 9 which includes encoder means for providing digital signals which represent the reading on said register, and in which said data means includes means connected to said encoder means for providing a word to said nonlinear impedance means having coded bits which represent said reading.

13. A remote meter reading system as set forth in claim 9 in which said data means includes means for providing signal bits of different voltage levels to represent said reading on said register, and means for applying said bits serially to said nonlinear impedance means.

14. A remote meter reading system as set forth in claim 9 in which said data means is connected common to a plurality of said registers, and includes register select means for selectively obtaining the information signals stored in each of said plurality of registers, and means for coupling the signals from a meter of said plurality selected by said register select means to modulate said nonlinear impedance means.

15. A remote meter reading system as set forth in claim 14 which includes control means for controlling said register select means to effect a plurality of readouts from each of said registers as selected.

16. A remote meter reading system as set forth in claim 15 in which said control means includes means connected to enable said register select means in the selection of different ones of said meters, and means connected to identify the register of said plurality which is selected at any given time.

17. A system as set forth in claim 9 in which said input means comprises a receive antenna tuned to said first frequency, and said output means comprises a transmit antenna tuned to the frequency of the harmonic signals.

18. In a remote meter reading system an antenna structure for use with a transponder located at a remote meter comprising antenna means including a receive section, a transmit section, nonlinear impedance means connected between said transmit and receive sections, and input means for connecting data signals across said nonlinear impedance means.

19. A system as set forth in claim 18 in which said receive section includes at least first and second elements and said tranmit section includes at least first and second elements, said nonlinear impedance means being connected between said first elements of said transmit and receive sections and in which said input means includes said second elements of said antenna receive and transmit sections.

20. A system as set forth in claim 18 in which at least a portion of said antenna structure is stamped from a flat metal sheet to provide an antenna structure in which at least certain elements of a transmit section and at least certain elements of a receive section lie in the same plane.

21. A system as set forth in claim 18 in which said nonlinear impedance means comprises a semiconductor having a p-n junction, the junction capacitance of which varies inversely as a function of the applied signal voltage.

22. A remote meter reading system as set forth in claim 21 in which said antenna receive section comprises a Yagi-type antenna structure having at least one driven element, and said transmit section comprises a further Yagi-type antenna structure having a further driven element, and said semiconductor is connected between the driven element of said receive section and the driven element of said transmit section.

23. In a remote meter reading system for obtaining information from remotely located registers, interrogate means including means for generating interrogate signals, and means for radiating said interrogate signals to the locations of said registers, and receive means for detecting coded signals radiated from said register locations, transponder means connected to one of said registers including antenna means for receiving said interrogate signals, and non-linear impedance means connected to said antenna means to vary in impedance to distort said interrogate signals, and thereby provide correspondingly modified signals for radiation by said antenna means back to said interrogate means, and data means for providing signals to modulate said modified signals with information obtained from said one register prior to radation of the modified signals to said interrogate means.

24. A remote meter reading system as set forth in claim 23 in which said data means includes means for providing said signals in a continuous, cyclic pattern, and in which said interrogate means includes radio frequency transmitter means mounted on mobile means for transmitting interrogate signals at a predetermined frequency, and the modified signals comprise a harmonic of said predetermined frequency, whereby the carrier signals for the information read out from the one register are present in the area of the register only during the period that the mobile unit is in the vicinity of said one register.

25. A remote meter reading system as set forth in claim 24 in which said data means include data storage means for storing data bits representing said information, and driver means responsive to said data bits to effect selective variation in the impedance of said nonlinear impedance means, whereby the amplitude of said modulated signals represents the information at said meter.

26. A remote meter reading system as set forth in claim 25 in which said data means includes register address data storage means for providing data bits for said driver means.

27. A remote meter reading system as set forth in claim 25 in which said non-linear impedance means comprise semiconductor means having a p-n junction, the junction capacitance of which varies inversely with the magnitude of the signals provided by said driver means.

28. A remote meter reading system as set forth in claim 27 in which said antenna means include a receive section for receiving said interrogate signals, and a transmit section for radiating said coded signals to said mobile unit, and said non-linear impedance means is connected between said transmit section and said receive section.

29. In a remote meter reading system for obtaining information from the register of remotely located meters, interrogate means including means for generating frequency signals, and means for radiating said frequency signals in the direction of one of said meters, transponder means at said one meter including antenna means having non-linear terminating impedance means responsive to said frequency signals to provide further frequency signals that are harmonics of the frequency signals transmitted from said unit for reradiation to said interrogate means, and data means for modulating said harmonic signals in accordance with the information on the register for said one meter, receive means in said interrogate means for receiving the signals radiated from said transponder means for said one meter which are harmonics of the frequency signals transmitted from said interrogate means, and data processing means connected to said receive means including means for recording the information signals received from said transponder means.

30. A system as set forth in claim 29 which includes mobile means for moving said interrogate means, said receive means and said data processing means to interrogate different meters in said system.

31. A remote meter reading system as set forth in claim 30 in which said nonlinear terminating impedance means comprises semiconductor means having a variable capacitance junction in which said junction capacitance varies as a function of bias applied to the semiconductor means by said data means.

32. A remote meter reading system as set forth in claim 31 in which said data means for modulating said harmonic signals provided by said nonlinear impedance means includes means for applying voltage signals representative of the register information as a bias to said semiconductor means, whereby the amplitude of the harmonic signals provided is varied as a function of the information on said register.

33. A remote meter reading system as set forth in claim 30 in which said antenna means include a receive section tuned to the frequency of said interrogate signals for receiving said frequency signals, and a transmit section tuned to the frequency of said harmonic signals for radiating said harmonic signals to said mobile unit.

34. In a remote meter reading system for obtaining information from remotely located meters, transponder means for each meter including antenna means having antenna receive means for receiving interrogate signals of predetermined frequency, and antenna transmit means for radiating coded signals to associated equipment, and nonlinear impedance means connected between said antenna receive means and said antenna transmit means, said nonlinear impedance means being responsive to said interrogate signals to vary in impedance to distort said interrogate signals and thereby provide harmonics of said interrogate signals for transmission over said antenna transmit means, and data means including meter reading data storage means for providing data signals representing the reading on the associated meter, and data readout means for periodically effecting readout of said meter reading data storage means and modulation of said nonlinear impedance means with signals representative of the stored information, whereby said harmonic signals are coded to represent the information at said meter location.

35. A remote meter reading system as set forth in claim 34 in which said non-linear impedance means comprises a variable capacitance diode having an anode connected to said transmit antenna means and a cathode connected to said receive antenna means, said diode having a p-n junction, the capacitance of which varies as a function of applied voltage.

36. A remote meter reading system as set forth in claim 34 in which said antenna receive means comprises a Yagi-type antenna having a driven element and in which said antenna transmit means comprises a further Yagi-type antenna having a driven element, said semiconductor means being connected between the driven element of said receive means and the driven element of said transmit means.

37. A remote meter reading system as set forth in claim 34 which includes encoder means for providing pulses which reverse in polarity for each quantum of a commodity measured by the meter, and in which said meter reading data storage means include pulse counter means responsive to said polarity changes to register a count of the quantums of the commodity measured by said meter.

38. A remote meter reading system as set forth in claim 34 in which said data means further include meter address data storage means for providing data representing an address for said meter, and in which said data readout means includes further means for effecting serial readout of said meter reading data storage means and said meter address data storage means.

39. A remote meter reading system as set forth in claim 38 in which said further means includes pulse register means and said data readout means include clock pulse generating means for controlling said pulse register means in the continuous readout of said meter reading data storage means and said meter address data storage means.

40. A remote meter reading system as set forth in claim 38 in which said further means includes pulse register means and said data readout means further include gate means controlled by said pulse register means to provide control signals for use in controlling modulation of certain harmonic signals provided by said nonlinear impedance means, whereby said certain harmonic signals are coded to represent sync pulses.

41. A remote meter reading system as set forth in claim 40 in which said gate means include means for providing control signals representing a start of message code prior to the provision of the signals which effect serial readout of said meter reading data storage means and said meter address data storage means.

42. A remote meter reading system as set forth in claim 34 which includes interrogate means mounted on a mobile unit having transmit means for generating interrogate signals and for selectively radiating said interrogate signals to one of said meters, and receiver means mounted on said mobile unit for receiving the coded signals radiated by the transponder means for each meter interrogated by said interrogate means.

43. In a remote meter reading system for obtaining information from remotely located meters, transponder means connected common to a group of said meters including antenna means for receiving interrogate signals from a remote interrogating means, non-linear impedance means connected to said antenna means which vary in impedance to distort said interrogate signals and thereby provide correspondingly modified signals for radiation by said antenna means back to said remote interrogate means, and data means including meter select means for selectively providing information data from each of said meters in said group to modulate the modified signals provided by said nonlinear impedance means.

44. A system as set forth in claim 43 in which said data means includes readout means for cyclically providing signals for enabling a selection by said meter select means, and control means for controlling said meter select means in the selection of a meter from said group.

45. A system as set forth in claim 43 in which said data means includes address means for identifying each selected meter, and control means for controlling said meter select means in the selection of successive meters in said group, and for simultaneously identifying the selected meter in said group to said address means.

46. A system as set forth in claim 43 in which said data means includes address means, readout means having word generator means, first counter means operative to count each word which is generated by said readout means, and second counter means controlled by said first counter means to provide control signals to enable said meter select means in the selection of a meter in said group, and to simultaneously provide signals to said address means to idenfity the meter in said group which is selected.

47. A system as set forth in claim 46 in which said address means includes a plurality of marking inputs, certain of which are premarked to identify said one group of meters, and others of which are marked by the changing value of said control signals to idenfity the different meters in said one group.

48. A system as set forth in claim 43 in which said data means includes storage means for each meter in said group, readout means for providing readout signals simultaneously to each of said meters, and in which said meter select means is operative to extend the output of only one meter at a time for coupling to said nonlinear impedance means.

49. A system as set forth in claim 43 which includes interrogate means mounted on a mobile unit for transmitting interrogate signals to the remotely located meters, and receive means mounted on said mobile unit for receiving the coded signals radiated by the antenna means at the interrogated meters, and means for recording the coded signals received by said receive means.

50. In a remote meter reading system for obtaining information from remotely located meters, transponder means connected to a common group of said meters including signal providing means operative to modify interrogate signals radiated from remote interrogating means to provide modified signals for radiation back to said remote interrogating means, data means including meter select means for selectively providing information data from each of said meters in said group to said signal providing means for modulation of said modified signals, control means for controlling said meter select means in the selection of a meter in said group, and readout means for enabling said meter select means to provide the information data from the selected one of said meters of said group to said signal providing means.

51. In a remote meter reading system for obtaining information from remotely located meters, transponder means connected common to a group of said meters including antenna means for receiving interrogate signals from remote interrogating means, means connected to said antenna means for distorting said interrogate signals thereby providing further signals for radiation by said antenna means back to said remote interrogating means, and data means including meter select means for automatically providing information data from each of said meters in said group in a predetermined pattern to modulate said further signals prior to transmission to said remote interrogating means.

52. In a remote meter reading system for obtaining information from remotely located meters, transponder means connected common to a group of said meters including means responsive to interrogate signals received from remote interrogating means to provide further signals for radiation back to said remote interrogating means, and data means including meter select means for automatically providing information data from each of said meters in said group in a predetermined pattern to modulate said further signals prior to transmission to said remote interrogating means.

* * * * *